(12) United States Patent
Vichik et al.

(10) Patent No.: US 10,676,379 B2
(45) Date of Patent: Jun. 9, 2020

(54) ELECTROLYSIS SYSTEMS AND METHODS FOR LIFE EXTENSION OF AN APPARATUS SUCH AS A BALLOON

(71) Applicant: LOON LLC, Mountain View, CA (US)

(72) Inventors: Sergey Vichik, Palo Alto, CA (US); Daniel Bowen, Palo Alto, CA (US); Sherri Goldman, Redwood City, CA (US); Richard Chad Bruns, Mountain View, CA (US); Daniel Alex Luebke, Mountain View, CA (US)

(73) Assignee: Loon LLC, Mountain View, CA (US)

( * ) Notice: Subject to any disclaimer, the term of this patent is extended or adjusted under 35 U.S.C. 154(b) by 447 days.

(21) Appl. No.: 15/622,119

(22) Filed: Jun. 14, 2017

(65) Prior Publication Data

US 2018/0362369 A1    Dec. 20, 2018

(51) Int. Cl.
| | |
|---|---|
| *C02F 1/467* | (2006.01) |
| *C25B 1/26* | (2006.01) |
| *C02F 1/461* | (2006.01) |
| *C02F 103/00* | (2006.01) |

(52) U.S. Cl.
CPC ............ *C02F 1/4674* (2013.01); *C02F 1/461* (2013.01); *C25B 1/26* (2013.01); *C02F 2103/008* (2013.01); *C02F 2201/4612* (2013.01); *C02F 2201/4619* (2013.01); *C02F 2201/46105* (2013.01)

(58) Field of Classification Search
CPC .... C02F 1/467; C02F 1/461; C02F 2103/008; C02F 2201/46105; C02F 2201/4612; C02F 2201/4619; C25B 1/26; C25B 1/02; C25B 1/04; B64C 2201/022
See application file for complete search history.

(56) References Cited

U.S. PATENT DOCUMENTS

| | | | |
|---|---|---|---|
| 6,628,941 B2 | 9/2003 | Knoblach et al. | |
| 7,203,491 B2 | 4/2007 | Knoblach et al. | |
| 7,356,390 B2 | 4/2008 | Knoblach et al. | |
| 7,469,857 B2 | 12/2008 | Voss | |
| 7,801,522 B2 | 9/2010 | Knoblach et al. | |
| 8,820,678 B2 | 9/2014 | DeVaul et al. | |
| 8,825,232 B2 | 9/2014 | Knoblach et al. | |

(Continued)

FOREIGN PATENT DOCUMENTS

WO    2017/213706 A1    12/2017

OTHER PUBLICATIONS

International Search Report and Written Opinion for Application No. PCT/US2018/034886 dated Nov. 2, 2018.

*Primary Examiner* — Rodney A Bonnette
(74) *Attorney, Agent, or Firm* — Botos Churchill IP Law (57) ABSTRACT

Systems and methods for extending life of an apparatus, such as a balloon, using electrolysis. A ballast liquid is carried or harvested and, when desired, is electrolyzed using an on-board electrolyzer to generate lift gas, rather than simply being dumped as traditional ballast. However, the ballast liquid may also be dumped, if necessary. A valve may be provided to enable safe dumping of the ballast liquid. The ballast liquid may be water, a water-methanol mixture, or other suitable ballast liquid. The ballast liquid may be stored in a container associated with the balloon prior to launch or may be harvested from the atmosphere while the balloon is in-flight. Features may be provided to maintain the ballast liquid in a liquid state. The lift gas mixture within the balloon is maintained non-flammable.

30 Claims, 5 Drawing Sheets

(56) References Cited

U.S. PATENT DOCUMENTS

| | | | |
|---|---|---|---|
| 8,967,533 | B2 | 3/2015 | DeVaul et al. |
| 9,139,279 | B2 | 9/2015 | Heppe |
| 9,296,461 | B1 | 3/2016 | Roach |
| 9,329,600 | B2 | 5/2016 | DeVaul et al. |
| 9,409,646 | B2 | 8/2016 | Fleck |
| 9,418,243 | B2 | 8/2016 | Bauer et al. |
| 9,419,902 | B1 | 8/2016 | Sites |
| 9,420,023 | B2 | 8/2016 | Ramamurthy et al. |
| 9,511,844 | B1 | 12/2016 | Devaul |
| 9,519,045 | B2 | 12/2016 | Knoblach et al. |
| 9,632,503 | B2 | 4/2017 | Knoblach et al. |
| 9,836,063 | B1 | 12/2017 | Bonawitz et al. |
| 2009/0294576 | A1 | 12/2009 | Laforge |
| 2010/0230968 | A1 | 9/2010 | Chernyshov |
| 2014/0042042 | A1 | 2/2014 | Devaul et al. |
| 2014/0374537 | A1 | 12/2014 | Anderson |
| 2015/0168955 | A1 | 6/2015 | Devaul et al. |
| 2015/0298806 | A1 | 10/2015 | Vander Lind et al. |
| 2016/0149301 | A1 | 5/2016 | Behroozi et al. |

ELECTROLYSIS SYSTEMS AND METHODS FOR LIFE EXTENSION OF AN APPARATUS SUCH AS A BALLOON

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Additional network infrastructure may be provided, for example, via a balloon network operating in the stratosphere. Such a balloon network may include a plurality of high-altitude balloons inflated with lift gas. Balloon networks, other aerial apparatus networks, other apparatus networks, and stand-alone apparatuses (aerial and non-aerial) may also be utilized for other purposes such as, for example, communications, surveillance, tracking, meteorology, etc.

SUMMARY

Systems and methods for extending the life of an apparatus such as, for example, a balloon, using electrolysis. A liquid is carried or harvested and, when desired, is electrolyzed using an on-board electrolyzer to generate lift gas. In a balloon, for example, ballast liquid is carried or harvested and, when desired, is electrolyzed using an on-board electrolyzer to generate lift gas for the balloon, rather than simply being dumped as traditional ballast. However, the ballast liquid may also be dumped, if necessary. A valve such as a drip valve or other suitable mechanism may be provided to enable safe dumping of the ballast liquid. The ballast liquid may be, for example, water or a water-methanol mixture, or may be another suitable ballast liquid suitable for electrolysis such as, for example, ethanol, ammonia, glycerol, or urea. The ballast liquid may be stored in a suitable container associated with, e.g., attached to or incorporated into, the balloon prior to launch or may be harvested from the atmosphere, e.g., via condensation or melting frost, while the balloon is in-flight. Features may be provided to maintain the ballast liquid in a liquid state such as, for example, storing the ballast liquid in a container having a highly solar-absorptive surface oriented towards the sun. The lift gas mixture within the balloon remains non-flammable by ensuring that the volume ratio of hydrogen (from the generated additional lift gas) to helium (from the initial lift gas) is maintained at or below a particular threshold. Other aspects and features of the present disclosure will become apparent hereinbelow.

In aspects of the present disclosure, a balloon is provided including an envelope containing a lift gas therein, a container attached thereto and storing ballast liquid therein, and an electrolyzer configured to receive the ballast liquid from the container, convert the ballast liquid into additional lift gas, and provide the additional lift gas to the envelope.

In an aspect of the present disclosure, the ballast liquid is water. In such aspects, the electrolyzer is configured to convert the water into hydrogen gas as the additional lift gas and oxygen gas as a byproduct gas. Alternatively, the ballast liquid may be an aqueous methanol-water mixture. In such aspects, the electrolyzer is configured to convert the aqueous methanol-water mixture into hydrogen gas as the additional lift gas and carbon dioxide gas as a byproduct gas.

In another aspect of the present disclosure, the container includes a valve configured to enable selective dumping of the ballast liquid.

In still another aspect of the present disclosure, the balloon further includes a condenser configured to condense water vapor into water and provide the water to the container for storage therein as ballast liquid. Additionally or alternatively, frost may be deposited into the container and melted to be stored therein as ballast liquid.

In yet another aspect of the present disclosure, the container includes a sun-facing surface and a shaded surface. In such aspects, the sun-facing surface may include a higher solar absorptivity as compared to the shaded surface. Further, an orientation of the container may be controlled such that the sun-facing surface remains oriented towards the sun.

In still yet another aspect of the present disclosure, the balloon further includes payload including communication components configured to enable connection to a data communication network.

In another aspect of the present disclosure, the balloon further includes a controller configured to control activation of the electrolyzer.

A method of controlling a balloon provided in accordance with aspects of the present disclosure includes storing ballast liquid in a container attached to balloon and electrolyzing the ballast liquid to convert the ballast liquid into additional lift gas that is provided to the balloon. The ballast liquid may be water and, thus, produce hydrogen gas as the additional lift gas and oxygen gas as a byproduct gas, or may be an aqueous methanol-water mixture and, thus, produce hydrogen gas as the additional lift gas and carbon dioxide gas as the byproduct gas.

In an aspect of the present disclosure, storing ballast liquid includes at least partially filling the container with the ballast liquid prior to launch of the balloon. Additionally or alternatively, storing the ballast liquid may include condensing water vapor into water for storage in the container as the ballast liquid. Ballast liquid may additionally or alternatively be stored in the container by depositing frost into the container and melting it.

In another aspect of the present disclosure, the method further includes opening a valve to dump at least a portion of the ballast liquid from the container. The valve may be opened to provide lift to the balloon when lift is required urgently.

In another aspect of the present disclosure, electrolysis is inhibited to prevent a lift gas of the balloon from becoming flammable.

Also provided in accordance with aspects of the present disclosure is a non-transitory computer-readable storage medium storing instructions. The instructions, when executed by a processor, cause the processor to determine whether lift is desired in a balloon including a container attached thereto and storing ballast liquid therein. If lift is desired, the processor determines whether the lift should be provided by dumping the ballast liquid or electrolyzing the ballast liquid. If it is determined that the lift should be provided by dumping the ballast liquid, the processor is caused to open a valve to dump the ballast liquid from the container. If it is determined that the lift should be provided by electrolyzing the ballast liquid, the processor is caused to initiate electrolysis of the ballast liquid to convert the ballast liquid into additional lift gas.

In aspects of the present disclosure, determining whether the lift should be provided by dumping the ballast liquid or electrolyzing the ballast liquid includes determining whether the lift is required urgently. Additionally or alternatively, determining whether the lift should be provided by dumping the ballast liquid or electrolyzing the ballast liquid includes determining a ratio of helium to hydrogen in a lift gas of the balloon.

An aerial vehicle provided in accordance with aspects of the present disclosure is configured to store and/or utilize lift gas. The aerial vehicle includes a container storing liquid therein and an electrolyzer configured to receive the liquid from the container, convert the liquid into additional lift gas, and provide the additional lift gas for storage or utilization by the aerial vehicle.

In an aspect of the present disclosure, the aerial vehicle further includes an envelope that contains a lift gas therein. In such aspects, the electrolyzer may be configured to provide the additional lift gas to the envelope.

In aspects, the aerial vehicle is a balloon.

In another aspect of the present disclosure, the liquid is water and the electrolyzer is configured to convert the water into hydrogen gas (the additional lift gas) and oxygen gas (a byproduct gas). Alternatively, the liquid is an aqueous methanol-water mixture and the electrolyzer is configured to convert the aqueous methanol-water mixture into hydrogen gas (the additional lift gas) and carbon dioxide gas (a byproduct gas).

In still another aspect of the present disclosure, the container includes a valve configured to enable selective dumping of the liquid.

In another aspect of the present disclosure, a condenser is configured to condense water vapor into water and provide the water to the container for storage therein.

In yet another aspect of the present disclosure, the container includes a sun-facing surface and a shaded surface. The sun-facing surface includes a higher solar absorptivity as compared to the shaded surface. An orientation of the container may be controlled such that the sun-facing surface remains oriented towards the sun.

In another aspect of the present disclosure, the aerial vehicle further includes a controller configured to control activation of the electrolyzer.

To the extent consistent, any of the aspects and features detailed herein may be used in conjunction with any or all of the other aspects and features detailed herein.

BRIEF DESCRIPTION OF THE DRAWINGS

Various aspects and features of the present disclosure are described herein with reference to the drawings wherein like reference numerals identify similar or identical elements and.

DETAILED DESCRIPTION

Systems and methods for extending life of an apparatus using electrolysis such as, for example, in a high-altitude balloon 200 (FIG. 2) of a balloon network 100 (FIG. 1) are illustrated in FIGS. 1-7 and detailed below.

Figure 1:
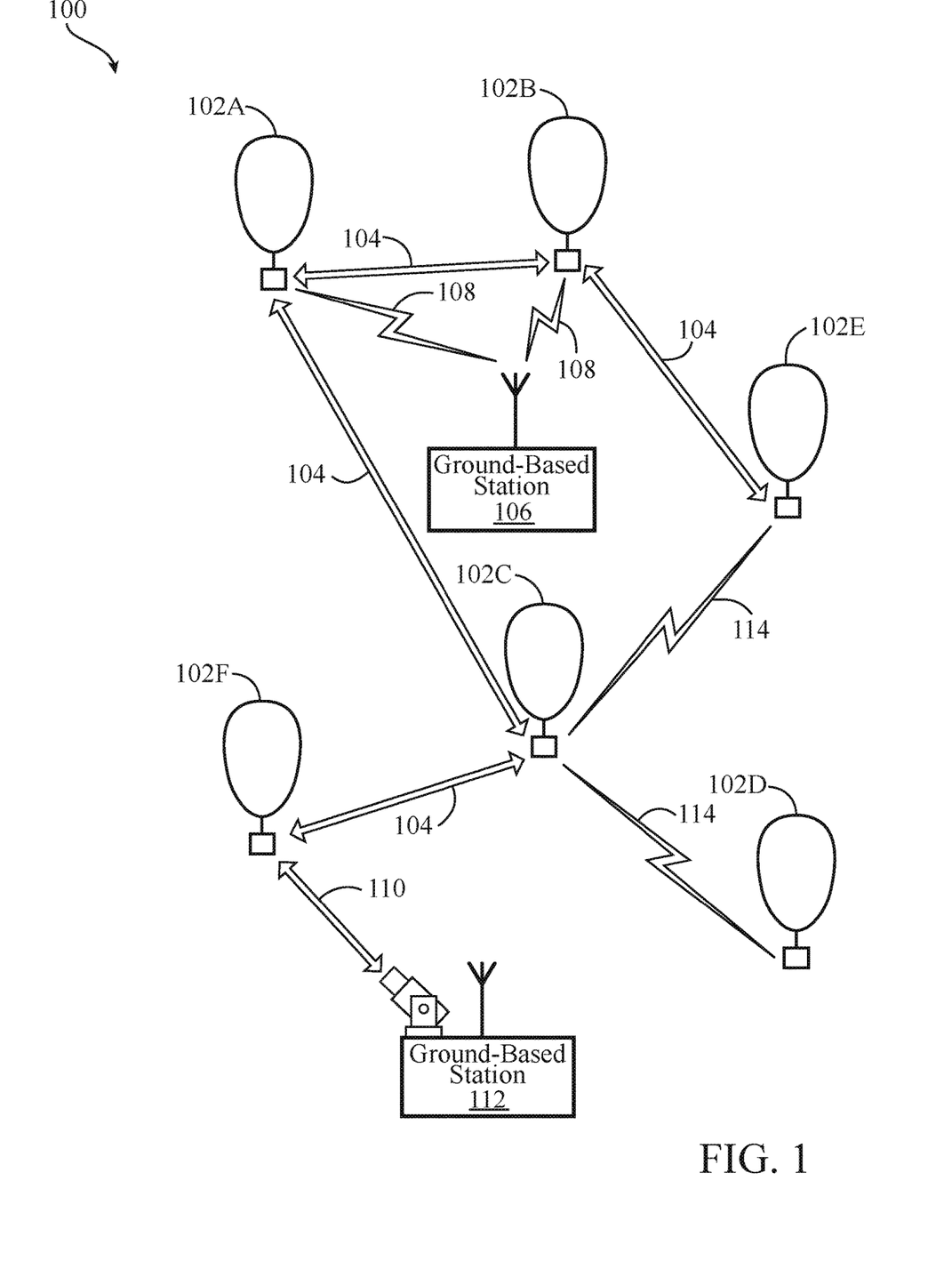
FIG. 1 is a simplified block diagram illustrating a balloon network according to aspects of the present disclosure.

Referring to FIG. 1, a balloon network 100 includes a plurality of high-altitude balloons 102A-102F configured to communicate with one another via optical links 104, RF links 114, and/or other suitable communication methods to enable balloons 102A-102F to collectively function, for example, as a mesh network for packet-data communications. Further, at least some of balloons 102A-102F, e.g., balloons 102A and 102B, may be configured for RF communications with a ground-based station 106 via respective RF links 108 and/or at least some of balloons 102A-102F may be configured to communicate with a ground-based station 112 via an optical link 110. Some or all of balloons 102A-102F may additionally or alternatively be configured to establish a communication link with space-based satellites.

Ground-based stations 106 and 112 may include components such as transceivers, transmitters, and/or receivers for communication via RF links 108 and/or optical links 110 with one or more of balloons 102A-102F. As such, ground-based stations 106 and 112 may be configured as access points through which various devices may connect to balloon network 100. Additionally or alternatively, ground-based stations 106 and 112 may be configured as gateways between balloon network 100 and one or more other networks, e.g., the Internet, a cellular service provider's network, and/or other types of networks.

Figure 2:
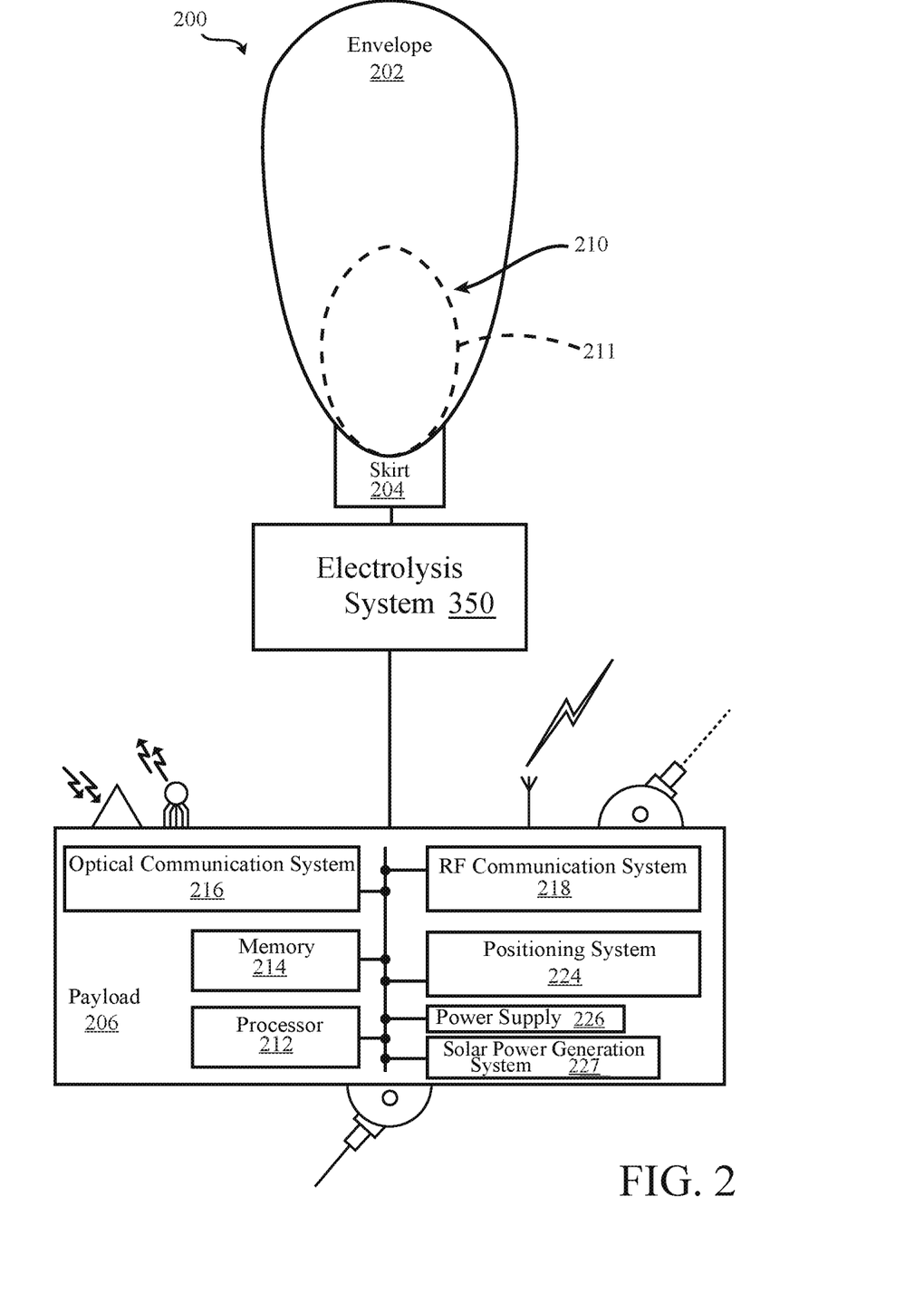
FIG. 2 is a simplified block diagram of a high-altitude balloon according to aspects of the present disclosure and configured for use with the balloon network of FIG. 1.

Referring to FIG. 2, various types of balloons may be incorporated into balloon network 100 (FIG. 1) such as, for example, a high-altitude balloon 200. High-altitude balloon 200 generally includes an envelope 202, a skirt 204, payload 206, and an electrolysis system 350, which is attached between skirt 204 and payload 206, although other locations for electrolysis system 350 are also contemplated. Balloon 200 may further include one or more cut-down systems (not shown) attached between skirt 204 and electrolysis system 350 and/or between electrolysis system 350 and payload 206. In addition, balloon 200 may be provided with a variable buoyancy system 210.

Envelope 202 and skirt 204 of balloon 200 may take various forms. More specifically, envelope 202 and/or skirt 204 may be made of any suitable materials including, for example, metalized MYLAR® or biaxially-oriented polyethylene terephthalate (BoPet). Additionally or alternatively, envelope 202 and/or skirt 204 may be constructed at least partially from a highly-flexible latex material or a rubber material such as chloroprene. Other materials are also contemplated. The particular configuration, e.g., materials, shape, and/or size, of envelope 202 and skirt 204 may vary depending upon a particular implementation. Further, envelope 202 may be filled with various different types of lift gases, such as, for example, helium, hydrogen, a helium-hydrogen mixture, or other suitable gas or gaseous mixture that is lighter than air. Although envelope 202 is described herein as part of balloon 200, the term envelope is meant to include any suitable structure of a balloon or other apparatus that receives or stores a lift gas therein.

Payload 206 of balloon 200 may include a processor 212 and on-board data storage, such as memory 214. Memory 214 may take the form of or include a non-transitory computer-readable medium having instructions stored thereon, which can be accessed and executed by processor 212 in order to carry out function relating to the operation, communication, and/or control of balloon 200. Thus, processor 212, in conjunction with instructions stored in memory 214, and/or other components, may function as a controller of balloon 200.

Payload 206 of balloon 200 may also include, for example, an optical communication system 216, which may transmit and/or receive optical signals, and/or an RF communication system 218, which may transmit and/or receive RF communications.

Payload 206 may further include a power supply 226 to supply power to the various components of payload 206 and/or other components of balloon 200. Power supply 226 may include a rechargeable battery or other suitable components for producing, storing, and/or supplying power. In addition, payload 206 may include a solar power generation system 227 including solar panels capable of generating power that charges and/or is distributed by power supply 226.

Payload 206 may additionally include a positioning system 224 such as, for example, a global positioning system (GPS), an inertial navigation system, and/or a star-tracking system. Positioning system 224 may additionally or alternatively include various motion sensors, e.g., accelerometers, magnetometers, gyroscopes, and/or compasses, one or more cameras (video and/or still cameras), and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted above, balloon 200, in embodiments, may include a variable buoyancy system 210 including a bladder 211. In embodiments, fluid container 370 (FIG. 3) of electrolysis system 350, detailed below, functions as bladder 211 of variable buoyancy system 210, or vice versa. Alternatively, balloon 200 may include both bladder 211 of variable buoyancy system 210 and fluid container 370 (FIG. 3) of electrolysis system 350. Variable buoyancy system 210 may include suitable components and/or features to effect a change in altitude of balloon 200 such as, for example, systems and/or mechanisms for heating and/or cooling the fluid within bladder 211, and pumps, valves, or other systems and/or mechanisms for adding fluid to and/or removing fluid from bladder 211.

Figure 3:
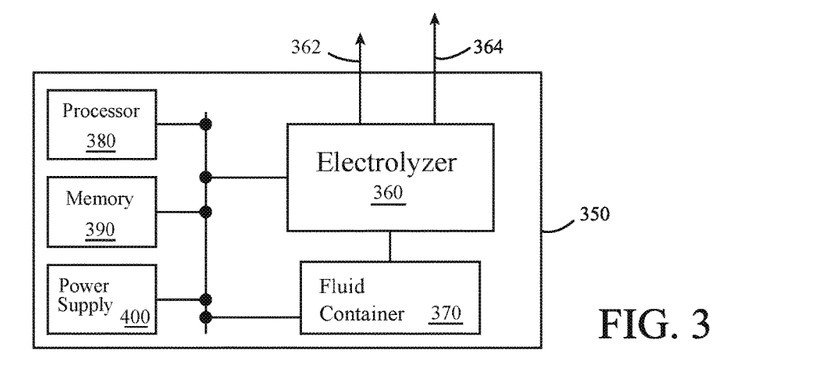
FIG. 3 is a simplified block diagram of an electrolysis system configured for use with the balloon of FIG. 2 in accordance with aspects of the present disclosure.

With reference to FIGS. 2 and 3, electrolysis system 350 of balloon 200 is configured to store ballast liquid and selectively convert the ballast liquid into lift gas for delivery to envelope 202 of balloon 200. As such, electrolysis system 350 may be selectively operated to increase the lift of balloon 200 in at least two ways, one by reducing the overall ballast mass (as a result of the use of the ballast liquid in generating the lift gas), and another by increasing the lift (as a result of providing the additional lift gas to envelope 202). Electrolysis system 350 may thus operate to counter-act lift gas leakage from envelope 202 of balloon 200, thus extending the usable life of balloon 200, and/or may be used to facilitate balloon 200 changing altitude, e.g., increasing altitude. In some embodiments, electrolysis system 350 of balloon 200 may further be configured to harvest ballast liquid for conversion into lift gas and/or to dump ballast liquid to reduce the overall mass of balloon 200, as detailed below.

With particular reference to FIG. 3, electrolysis system 350 generally includes an electrolyzer 360, a lift gas output line 362, a byproduct gas output line 364, and a fluid container 370. Electrolysis system 350 may further include a processor 380, a memory 390, and a power supply 400.

Processor 380 is associated with an on-board data storage, such as memory 390. Memory 390 may take the form of or include a non-transitory computer-readable medium having instructions stored thereon, which can be accessed and executed by processor 380 in order to carry out function relating to the operation, communication, and/or control electrolysis system 350. Thus, processor 380, in conjunction with instructions stored in memory 390, and/or other components, may function as a controller of electrolysis system 350. As an alternative to providing electrolysis system 350 with processor 380, memory 390, and power supply 400, electrolysis system 350 may be controlled directly via processor 212 and memory 214 of payload 206 and/or powered via power supply 226 of payload 206 (see FIG. 2).

Figure 4A:
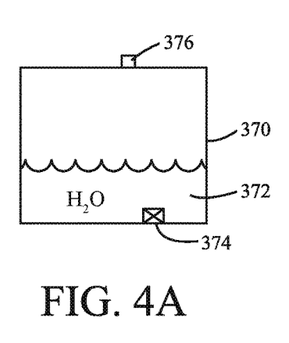
FIG. 4A is a simplified illustration of a fluid container of the electrolysis system of FIG. 3 in accordance with aspects of the present disclosure.
Figure 4B:
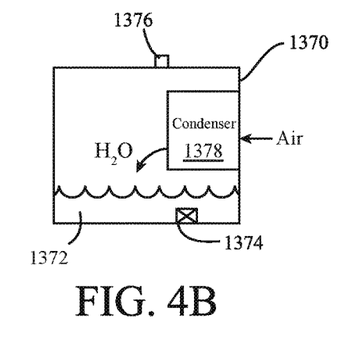
FIG. 4B is a simplified illustration of another fluid container according to another embodiment, configured for use with the electrolysis system of FIG. 3 in accordance with aspects of the present disclosure.
Figure 4C:
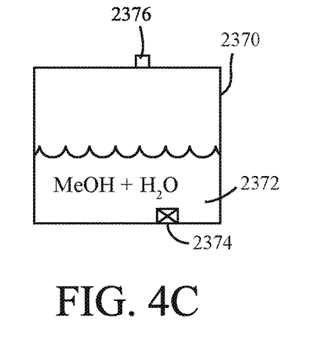
FIG. 4C is a simplified illustration of still another fluid container according to still another embodiment, configured for use with the electrolysis system of FIG. 3 in accordance with aspects of the present disclosure.

Electrolyzer 360 may be any suitable electrolyzer capable of generating a lift gas, e.g., hydrogen, from a ballast liquid, e.g., a liquid water ballast liquid 372, 1372, 3372 (FIGS. 4A, 4B, and 5, respectively) or an aqueous water-methanol mixture ballast liquid 2372 (FIG. 4C). Other suitable ballast liquids such as, for example, ethanol, ammonia, glycerol, or urea are also contemplated. Electrolyzer 360, more specifically, is configured to convert ballast liquid into additional lift gas, which is provided to envelope 202 of balloon 200 via lift gas output line 362, and a byproduct gas, which, via byproduct gas output line 364, is expelled from balloon 200. Lift gas output line 362 and byproduct gas output line 364 may include any suitable tubing, piping, valving, etc.

Referring also to FIG. 4A, fluid container 370 of FIG. 3A is configured to store water as ballast liquid 372 and provide the same to electrolyzer 360. Fluid container 370 may be within, attached to, or otherwise associated with balloon 200. Fluid container 370 may be sufficiently filled, as required, with water (or other ballast liquid) prior to launch of balloon 200.

Fluid container 370 includes a valve 374 and an output 376. Valve 374 enables ballast liquid 372, e.g., water, to be dumped from fluid container 370 into the surrounding environment when valve 374 is opened. Valve 374 may be electronically controlled, e.g., via processor 380, to enable the selective dumping of ballast liquid 372. More specifically, valve 374 may be opened to allow ballast liquid 372 to be dumped from fluid container 370 as traditional ballast, that is, in order to reduce the overall mass of balloon 200 and thereby increase the lift of balloon 200. Such may be advantageous in instances where increased lift is required urgently (where generating lift via the relatively slower electrolysis process is temporally insufficient). Valve 374 may be a drip valve or other suitable valve configured to enable the safe dumping of ballast liquid 372 from fluid container 370 into the surrounding environment.

Output 376 of fluid container 370 may be disposed at any suitable location on fluid container 370 and/or may be coupled to any suitable mechanisms, e.g., valves, pumps, etc., to enable ballast liquid 372 to selectively flow or be pumped from fluid container 370, through output 376, to electrolyzer 360.

In embodiments where the ballast liquid 372 is water, such as is stored in fluid container 370, the electrolyzer 360 is configured to convert the water provided thereto from fluid container 370 into hydrogen gas, which constitutes the additional lift gas provided to envelope 202 via lift gas output line 362, and oxygen gas, which constitutes the byproduct gas that is output via byproduct gas output line 364.

With reference to FIG. 4B, in embodiments, another fluid container 1370 for use with electrolysis system 350 (FIG. 3) may be provided storing water as the ballast liquid 1372 and including a valve 1374 and an output 1376, similarly as detailed above with respect to fluid container 370 (FIG. 4A). Fluid container 1370 further includes a condenser 1378 configured to harvest water from the surrounding environment by condensing water vapor in the air surrounding balloon 200 (FIG. 2) into water for storage in fluid container 1370 as ballast liquid 1372. Fluid container 1370 may be at least partially filled with ballast liquid 1372 prior to launch of balloon 300 and thereafter utilize condenser 1378 to harvest water from the surrounding environment to replenish the ballast liquid 1372, or fluid container 1370 may be empty at launch and rely solely on the use of condenser 1378 in-flight to harvest water to be utilized as ballast liquid 1372. As an alternative to or in addition to condensing, frost may be deposited into the fluid container 1370 and melted to be stored therein as ballast liquid 1372.

In embodiments where fluid container 1370 is implemented, balloon 200 (FIG. 2) may be configured to drop down below the tropopause to enable condenser 1378 to condense greater amounts of water vapor into liquid water to be stored in fluid container 1370 as ballast liquid 1372. Ballast liquid 1372 may be fed to electrolyzer 360 (FIG. 3) via output 1376 and utilized via electrolyzer 360 (FIG. 3) similarly as detailed above, and/or may be dumped from fluid container 1370 via valve 1374, similarly as with valve 374 of fluid container 370 (see FIG. 4A).

Referring to FIG. 4C, in embodiments, a fluid container 2370 may be provided for use with electrolysis system 350 (FIG. 3) that stores therein an aqueous water-methanol mixture as ballast liquid 2372. Fluid container 2370 includes a valve 2374 and an output 2376, similarly as detailed above with respect to fluid container 370 (FIG. 4A). In embodiments where ballast liquid 2372 is an aqueous water-methanol mixture, such as is stored in fluid container 2370, the electrolyzer 360 (FIG. 3) is configured to convert the aqueous water-methanol mixture provided thereto from fluid container 2370 into hydrogen gas, which constitutes the additional lift gas provided to envelope 202 (FIG. 2) via lift gas output line 362 (FIG. 3), and carbon dioxide gas, which constitutes the byproduct gas that is output via byproduct gas output line 364 (FIG. 3). Utilizing an aqueous water-methanol mixture as the ballast liquid 2372 may be advantageous at least in that the power requirements for electrolyzing aqueous water-methanol mixture are significantly less than those required to electrolyze water. Utilizing an aqueous water-methanol mixture as the ballast liquid 2372 may also be advantageous in that an aqueous water-methanol mixture has a lower freezing point than water and, thus, may not require heating to maintain it in an aqueous state despite the relatively cold conditions of the stratosphere.

Figure 5:
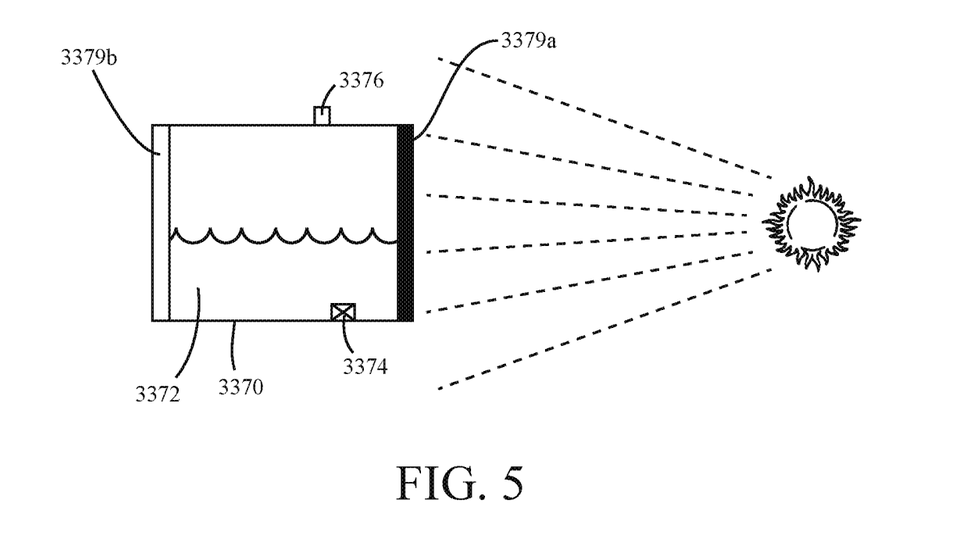
FIG. 5 is a simplified illustration of yet another fluid container according to yet another embodiment, configured for use with the electrolysis system of FIG. 3 in accordance with aspects of the present disclosure, wherein a portion of the fluid container is oriented toward the sun.

Referring to FIG. 5, as temperatures in the stratosphere are relatively cold, the ballast liquid 3372 may freeze, particularly in embodiments where the ballast liquid 3372 is water. As such, another fluid container 3370 configured for use with electrolysis system 350 (FIG. 3) is provided to maintain the ballast liquid 3372 stored therein in a liquid state. Fluid container 3370 includes a valve 3374 and an output 3376, similarly as detailed above, and further includes a sun-facing surface 3379a and a shaded-surface 3379b. Balloon 200 (FIG. 2) may include suitable components to maintain balloon 200 in an orientation wherein sun-facing surface 3379a of container 3370 is oriented towards the sun and wherein shaded-surface 3379b of fluid container 3370 is in the shade.

Sun-facing surface 3379a of container 3370 may be formed and/or coated to provide a relatively high solar absorptivity. For example, sun-facing surface 3379a may be painted black or include a "selective-black" metalized coating. Shaded-surface 3379b, on the other hand, may be formed and/or coated to provide insulation. For example, shaded-surface 3379b may be insulated and metalized with a low-emissivity coating. By providing sun-facing surface 3379a and shaded-surface 3379b in this manner, ballast liquid 3372 within container 3370 may be sufficiently heated in the daytime by the sun to maintain ballast liquid 3372 in liquid form during the day, if not also throughout the night. Electrolysis system 350 (FIG. 3) may thus be operated at least in the day and, if ballast liquid 3372 is maintained in liquid form, also at night.

With fluid container 3370 including, at least initially, a relatively large amount of ballast liquid 3372 stored therein, the ballast liquid 3372 may serve the additional purpose of functioning as a thermal mass. More specifically, since the ballast liquid 3372 is heated during the day by the sun, the heated ballast liquid 3372 takes longer to cool down at night. Accordingly, the temperature of the components, e.g., processor 380, memory 390, and/or power supply 400 (see FIG. 3), in close proximity to the ballast liquid 3372 is regulated such that these components also take longer to cool down at night, conserving energy that would typically be required to maintain these components at temperatures above their failure temperatures. Referring also to FIG. 2, in embodiments where electrolysis system 350 is included in payload 206, or is positioned in close proximity thereto, ballast liquid 3372 may likewise serve as a thermal mass for some or all of the components of payload 206.

Figure 6:
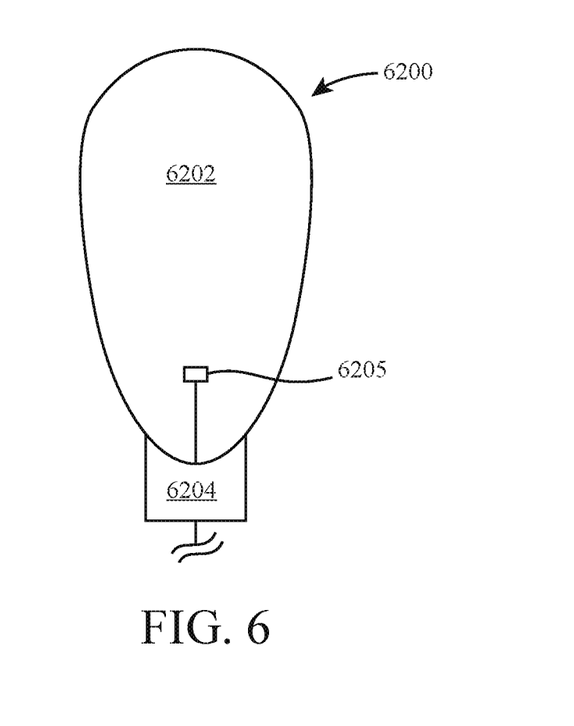
FIG. 6 is a simplified illustration of a portion of another high-altitude balloon according to another embodiment, configured for use with the balloon network of FIG. 1.

Turning to FIG. 6, in embodiments, a balloon 6200 may include a sensor 6205 disposed within envelope 6202 thereof (as shown), disposed within skirt 6204 thereof, or disposed at any other suitable location on or within balloon 6200. Sensor 6205 may be configured to sense the composition of lift gas within envelope 6202 and, based thereupon, enable the calculation of the ratio of helium gas to hydrogen gas, which is the additional lift gas provided by electrolysis system 350 (FIG. 2), although some hydrogen gas may also be provided as part of the initial lift gas. The ratio of helium gas to hydrogen gas may be calculated by processor 380 of electrolysis system 350 (FIG. 3), for example, or by processor 212 of payload 206 (FIG. 2), as another example. The calculated ratio of helium gas to hydrogen gas may be compared to a flammability threshold to ensure that the lift gas is maintained in a non-flammable state. It has been found that a hydrogen-helium mixture is non-flammable so long as the mixture is at least 92% helium, by volume. Thus, an appropriate threshold value or ratio may be selected to correspond to a mixture of at least 92% helium, by volume. Sensor 6205, in conjunction with processor 380 of electrolysis system 350 (FIG. 3), for example, may be utilized to inhibit further operation of electrolysis system 350 (FIG. 3) when the threshold value or ratio is reached such that additional hydrogen (in the form of the additional lift gas provided by electrolysis system 350) is not provided to envelope 6202, thus helping to ensure that the hydrogen-helium mixture within envelope 6202 remains non-flammable. As an alternative to providing sensor 6205 and monitoring the ratio of helium gas to hydrogen gas relative to a flammability threshold, the system may be configured such that the system is incapable of producing enough hydrogen to reach the flammability limit.

Figure 7:
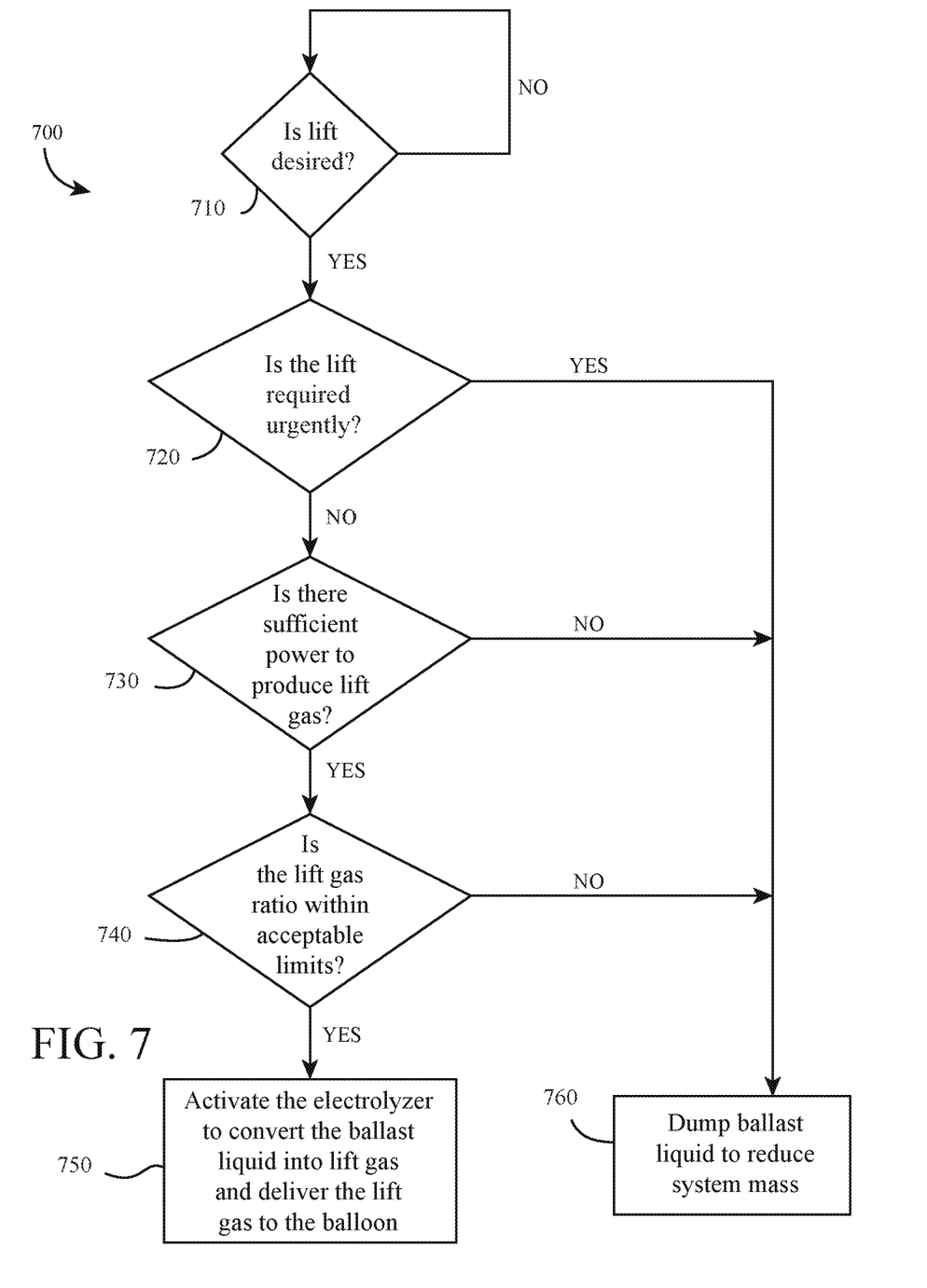
FIG. 7 is a flow diagram illustrating a method in accordance with aspects of the present disclosure.

Referring to FIG. 7, use of an electrolysis system according to any of the embodiments detailed above and/or including any combination of features (to the extent consistent) thereof for increasing the lift of a balloon in the two-fold manner detailed above (reducing the overall ballast mass and increasing the lift gas) is described and generally identified as method 700.

According to method 700, generally, it is determined whether lift is desired at 710. If lift is desired ("YES" at 710), the electrolysis system is activated to convert the ballast liquid into lift gas and to deliver the lift gas to the envelope of the balloon, as indicated at 750. Lift may be desired in order to adjust altitude, e.g., to maintain altitude, increase altitude, or limit the decrease in altitude, or may be desired to simply generate additional lift gas (to, for example, enable altitude adjustment at a later time). Thus, "lift," as utilized herein, includes both kinetic lift (to enable present altitude adjustment), and potential lift (to enable future altitude adjustment).

Additional features may be provided when lift is desired, such as those detailed below and indicated at 720-740. It is thus understood that method 700 may include none, some, or all of 720-740, depending upon a particular purpose. Method 700 may be implemented via on-board components of the balloon, e.g., processor 380 and memory 390 of electrolysis system 350 (FIG. 3) or processor 212 and memory 214 of payload 206 (FIG. 2), and/or may be implemented via other components of or in communication with balloon network 100 (FIG. 1).

At 710, as noted above, it is determined whether lift is desired. This determination may include, for example, receiving instructions to increase altitude, receiving instructions to maintain altitude, receiving instructions to limit altitude decrease, receiving instructions to generate additional lift gas, receiving feedback from one or more sensors or systems, occurrence of a particular event, passage of a particular length of time, reaching a particular in-flight age of the balloon, recognition of a particular condition (of the balloon or surrounding environment), etc.

If it is determined that lift is not desired ("NO" at 710), 710 may be repeated or the method may end. The determination of whether lift is desired may be repeated periodically, upon occurrence of a particular event, upon recognition of a particular condition (of the balloon or surrounding environment), upon instruction, etc.

If it is determined that lift is desired ("YES" at 710), the method proceeds to 720 or, in other embodiments, may skip to 730, 740, or 750. Further, any or all of 720-740 may be performed in any order or may be performed simultaneously. At 720, it is determined whether lift is required urgently. Urgency may be determined, for example, by the fact that lift is needed sooner than it would be able to be provided via electrolysis, by virtue of a safety or emergency condition, and/or in another suitable manner. If it is determined that lift is required urgently ("YES" at 720), the method proceeds to 760, detailed below.

If it is determined that lift is not required urgently ("NO" at 720), the method proceeds to 730, where it is determined whether there is sufficient power to produce the additional lift gas via electrolysis. If it is determined that there is not sufficient power to produce the additional lift gas via electrolysis ("NO" at 730), the method may proceed to 760, detailed below, may end, or may revert back to 710.

If it is determined that there is sufficient power to produce the additional lift gas via electrolysis ("YES" at 730), the method proceeds to 740, where it is determined whether the lift gas ratio in the envelope of the balloon is within acceptable limits. More specifically, it may be determined whether the ratio of helium gas to hydrogen gas in the envelope of the balloon is such that the lift gas in the envelope is approaching a flammable state. If it is determined that the lift gas ratio is not within acceptable limits ("NO" at 740), electrolysis is not permitted to occur so as to inhibit the lift gas in the envelope of the balloon from becoming flammable. Rather, the method proceeds to 760, detailed below, ends, or reverts back to 710. As noted above, the system may be configured as a whole to inhibit flammability and, thus, 730 need not be provided in such embodiments.

If it is determined that the lift gas ratio is within acceptable limits ("YES" at 740), the method proceeds to 750 wherein, as detailed above, the electrolysis system is activated to convert the ballast liquid into lift gas and to deliver the lift gas to the envelope of the balloon, thus providing the desired lift in the two-fold manner detailed above.

Additional determinations may be included in method 700 prior to proceeding to 750 such as, for example, a determination of whether there is sufficient ballast liquid (requiring a "YES" before proceeding to 750), a determination of whether the ballast liquid is in liquid form (requiring a "YES" before proceeding to 750), etc.

Should the method proceed to 760, such as based on any of the determinations above, electrolysis is not initiated but, rather, ballast liquid is dumped, e.g., via opening a valve in the fluid container storing the ballast liquid, as traditional ballast. Thus, although additional lift gas is not generated, some lift is still provided due to the fact that the overall mass of the ballast liquid and, thus, the overall mass of the balloon, is reduced by the dumping of the ballast liquid.

Electrolysis, as provided at 750, or dumping of ballast liquid, as provided at 760, may continue until the desired lift is provided, for a pre-determined length of time, until conditions change, etc. Additionally or alternatively, 720-740 may be repeated while electrolysis or dumping of ballast liquid is occurring so as to determine whether and when either should be terminated and/or to determine whether and when switching between electrolysis and dumping of ballast liquid should occur.

Further, as opposed to determining whether to initiate electrolysis, electrolysis may be performed continuously, at prescribed intervals, or in any other suitable manner, etc.

Although the electrolysis systems and methods of the present disclosure are described above for use in a balloon of a balloon network, the electrolysis systems of the present disclosure are equally applicable for use with other apparatuses including: other aerial vehicles such as, for example, other aerostats (blimps, airships, etc.) and other vehicles (aerial and non-aerial) that store and/or utilize lift gas.

The electrolysis systems and methods of the present disclosure and, in particular, those harvesting water for use with an on-board electrolyzer, are also applicable for use with any suitable apparatus that utilizes hydrogen gas, e.g., hydrogen-powered vehicles or other apparatuses powered by hydrogen or including hydrogen-powered components. With respect to an apparatus that utilizes hydrogen gas, liquid (e.g., water) may be stored, harvested, or otherwise obtained to produce hydrogen gas using an on-board electrolysis system as detailed above, for the particular purpose of the apparatus. Harvesting water to produce hydrogen gas utilizing an electrolysis system as detailed above may have applicability for use with hydrogen-powered vehicles or apparatuses with hydrogen-powered components, as the life of such vehicles and apparatuses can be extended so long as water can be harvested or otherwise obtained. These vehicles and apparatuses may be aerial apparatuses, land apparatuses, water apparatuses, space apparatuses, and/or hybrids thereof, and may be utilized for connectivity, communication, surveillance, tracking, meteorology, and/or other purposes.

From the foregoing and with reference to the various drawing figures, those skilled in the art will appreciate that certain modifications can also be made to the present disclosure without departing from the scope of the same. While exemplary embodiments of the disclosure have been shown in the drawings and described hereinabove, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A balloon, comprising:
   an envelope containing a lift gas therein;
   a container storing ballast liquid therein; and
   an electrolyzer configured to receive the ballast liquid from the container, convert the ballast liquid into additional lift gas, provide the additional lift gas to the envelope, and inhibit electrolysis to prevent the lift gas from becoming flammable.

2. The balloon according to claim 1, wherein the ballast liquid is water, wherein the electrolyzer is configured to convert the water into hydrogen gas and oxygen gas, and wherein the hydrogen case is the additional lift gas and the oxygen gas is a byproduct gas.

3. The balloon according to claim 1, wherein the ballast liquid is an aqueous methanol-water mixture, wherein the electrolyzer is configured to convert the aqueous methanol-water mixture into hydrogen gas and carbon dioxide gas, and wherein the hydrogen gas is the additional lift gas and the carbon dioxide gas is a byproduct gas.

4. The balloon according to claim 1, wherein the container includes a valve configured to enable selective dumping of the ballast liquid.

5. The balloon according to claim 1, further comprising a condenser configured to condense water vapor into water and provide the water to the container for storage therein as ballast liquid.

6. The balloon according to claim 1, wherein the container includes a sun-facing surface and a shaded surface, the sun-facing surface including a higher solar absorptivity as compared to the shaded surface.

7. The balloon according to claim 6, wherein an orientation of the container is controlled such that the sun-facing surface remains oriented towards the sun.

8. The balloon according to claim 1, further comprising payload including communication components configured to enable connection to a data communication network.

9. The balloon according to claim 1, further comprising a controller configured to control activation of the electrolyzer.

10. A method of controlling a balloon, comprising:
    storing ballast liquid in a container associated with a balloon;
    electrolyzing the ballast liquid to convert the ballast liquid into additional lift gas;
    providing the additional lift gas to the balloon; and
    inhibiting electrolysis to prevent the lift gas from becoming flammable.

11. The method according to claim 10, wherein the ballast liquid is water, and wherein electrolyzing the water includes producing hydrogen gas as the additional lift gas and oxygen gas as a byproduct gas.

12. The method according to claim 10, wherein the ballast liquid is an aqueous methanol-water mixture, and wherein electrolyzing the aqueous methanol-water mixture includes producing hydrogen gas as the additional lift gas and carbon dioxide gas as a byproduct gas.

13. The method according to claim 10, wherein storing the ballast liquid includes at least partially filling the container with the ballast liquid prior to launch of the balloon.

14. The method according to claim 10, wherein storing the ballast liquid includes condensing water vapor into liquid water or melting frost into liquid water for storage in the container as the ballast liquid.

15. The method according to claim 10, further comprising opening a valve to dump at least a portion of the ballast liquid from the container.

16. The method according to claim 15, wherein the valve is opened to provide lift to the balloon when lift is required urgently.

17. A non-transitory computer-readable storage medium storing instructions that, when executed by a processor, cause the processor to:
    determine whether lift is desired in a balloon having associated therewith a container storing ballast liquid therein;
    if lift is desired, determine whether the lift should be provided by dumping the ballast liquid or electrolyzing the ballast liquid;
    if it is determined that the lift should be provided by dumping the ballast liquid, open a valve to dump the ballast liquid from the container;
    if it is determined that the lift should be provided by electrolyzing the ballast liquid, initiate electrolysis of the ballast liquid to convert the ballast liquid into additional lift gas; and
    prohibit electrolysis of the ballast liquid if it is determined that further electrolysis would cause the lift gas to become flammable.

18. The medium according to claim 17, wherein determining whether the lift should be provided by dumping the ballast liquid or electrolyzing the ballast liquid includes determining whether the lift is required urgently.

19. The medium according to claim 17, wherein determining whether the lift should be provided by dumping the ballast liquid or electrolyzing the ballast liquid includes determining a ratio of helium to hydrogen in a lift gas of the balloon.

20. An aerial vehicle, the aerial vehicle at least one of storing or utilizing lift gas, the aerial vehicle comprising:
    a container storing liquid therein; and an electrolyzer configured to receive the liquid from the container, convert the liquid into additional lift gas, provide the additional lift gas for storage or utilization by the aerial vehicle, and inhibit electrolysis to prevent the lift gas from becoming flammable.

21. The aerial vehicle according to claim 20, wherein the aerial vehicle further includes an envelope, the envelope containing a lift gas therein.

22. The aerial vehicle according to claim 21, wherein the electrolyzer is configured to provide the additional lift gas to the envelope.

23. The aerial vehicle according to claim 20, wherein the aerial vehicle is a balloon.

24. The aerial vehicle according to claim 20, wherein the liquid is water, wherein the electrolyzer is configured to convert the water into hydrogen gas and oxygen gas, and wherein the hydrogen gas is the additional lift gas and the oxygen gas is a byproduct gas.

25. The aerial vehicle according to claim 20, wherein the liquid is an aqueous methanol-water mixture, wherein the electrolyzer is configured to convert the aqueous methanol-water mixture into hydrogen gas and carbon dioxide gas, and wherein the hydrogen gas is the additional lift gas and the carbon dioxide gas is a byproduct gas.

26. The aerial vehicle according to claim 20, wherein the container includes a valve configured to enable selective dumping of the liquid.

27. The aerial vehicle according to claim 20, further comprising a condenser configured to condense water vapor into water and provide the water to the container for storage therein.

28. The aerial vehicle according to claim 20, wherein the container includes a sun-facing surface and a shaded surface, the sun-facing surface including a higher solar absorptivity as compared to the shaded surface.

29. The aerial vehicle according to claim 28, wherein an orientation of the container is controlled such that the sun-facing surface remains oriented towards the sun.

30. The aerial vehicle according to claim 20, further comprising a controller configured to control activation of the electrolyzer.

* * * * *

UNITED STATES PATENT AND TRADEMARK OFFICE
CERTIFICATE OF CORRECTION

PATENT NO.       : 10,676,379 B2
APPLICATION NO.  : 15/622119
DATED            : June 9, 2020
INVENTOR(S)      : Sergey Vichik et al.

Page 1 of 1

It is certified that error appears in the above-identified patent and that said Letters Patent is hereby corrected as shown below:

In the Claims

Claim 2, Column 11, Line 46:
Delete "wherein the hydrogen case is the additional lift gas and the"; and insert -- wherein the hydrogen gas is the additional lift gas and the --

Signed and Sealed this
Twenty-ninth Day of December, 2020

Andrei Iancu
*Director of the United States Patent and Trademark Office*